United States Patent

[11] 3,547,199

| [72] | Inventors | H. R. Froning;<br>Jack L. Shelton; Syed H. Raza, Tulsa, Okla. |
|---|---|---|
| [21] | Appl. No. | 777,135 |
| [22] | Filed | Nov. 19, 1968 |
| [45] | Patented | Dec. 15, 1970 |
| [73] | Assignee | Pan American Petroleum Corporation<br>Tulsa, Okla.<br>a corporation of Delaware |

[54] METHOD FOR COMBATING WATER PRODUCTION IN OIL WELLS
15 Claims, No Drawings

| [52] | U.S. Cl. | 166/305 |
|---|---|---|
| [51] | Int. Cl. | E21b 43/25 |
| [50] | Field of Search | 166/263,<br>273, 305, 274, 292, 294, 309 |

[56] References Cited
UNITED STATES PATENTS

| 3,207,218 | 9/1965 | Holbrook et al. | 166/305 |
|---|---|---|---|
| 3,311,167 | 3/1967 | O'Brien et al. | 166/263 |
| 3,318,379 | 5/1967 | Bond et al. | 166/273 |
| 3,330,346 | 7/1967 | Jacobs et al. | 166/273 |
| 3,330,351 | 7/1967 | Bernard | 166/305 |
| 3,460,623 | 8/1969 | Leach | 166/273 |
| 3,464,491 | 9/1969 | Froning | 166/273X |

*Primary Examiner*—Stephen J. Novosad
*Attorneys*—Paul F. Hawley and Arthur Mc Ilroy

ABSTRACT: This invention is directed to a method for shutting off or decreasing the flow of water into an oil well. The water flow may be commingled with oil production from the formation or unassociated with it. According to the invention, a solution of an oil-sensitive water soluble foaming agent is first injected into the zone of interest followed by a spacer liquid which serves to push the foaming agent solution farther out into formation. Thereafter a gas such as flue gas, natural gas, or the like, is injected which fingers its way into the foaming agent solution to form a foam bank. Since the foaming agent is oil sensitive it tends to produce foam substantially only in those sections of the formation that primarily contain water. The presence of foam results in an effective reduction or shutoff of the water flow. Over a period of time the foam may degenerate but can be reformed by repeating the above cycle.

METHOD FOR COMBATING WATER PRODUCTION IN OIL WELLS

INTRODUCTION

The present invention relates to an improved method of oil production and more particularly it is concerned with a procedure for reducing water flow which is either commingled with the oil or is produced from a separate zone in the oil bearing formation. As opposed to a frontal drive system, this invention is directed to treatment of the reservoir about the bore of a producing well having the problem of high water-oil ratios.

BACKGROUND OF THE INVENTION

Production of water along with crude oil is a problem that generally is tolerated so long as the lifting and separating costs do not become uneconomical. The production of water not only adds to the expense of obtaining the oil, but also poses problems in its disposal. Where water entry occurs largely in a level of the formation different from that yielding the oil, the water flow is oftentimes controlled by squeeze cementing or casing the producing formation and perforating through only to the oil production zone. These methods while generally effective have not necessarily met with unqualified success and, of course, cannot be used with any positive effect where the oil and water are commingled and are produced essentially from the same zone and from zones close together or poorly separated.

BRIEF DESCRIPTION OF THE INVENTION

It is recognized that water enters the bore of an oil well via two routes. It flows associated with oil in some parts of the pay zone (both water and oil are produced at the well face) and it flows by itself (nonassociated) through loose zones, i.e., where high permeability streaks or fractures, or both, exist in the formation. While most methods proposed in the past attempt to combat either the associated or the nonassociated water, our invention proposes a method capable of combating the flow of both associated—or effective—and nonassociated water. In addition the process of our invention can be used to promote higher oil producing rates from reservoirs that contain viscous crudes. Briefly, our invention provides a method that is highly selective for the reduction of water flow, whether commingled with or essentially separated from the oil producing zone(s). This result is accomplished by first discontinuing production from the well and then injecting into the formation a solution of a foaming agent preferably followed by a slug of water or equivalent material which, in turn, is forced through the formation by a suitable inert gas such as air, flue gas, nitrogen, natural gas, or hydrocarbon enriched natural gas. The slug of water serves to force the foaming agent out into the formation, typically 15 to 125 feet from the well, after which gas is injected agitating the solution of foaming agent to produce a foam within the formation. When this stage is reached the well is again placed on production and operation continues until water-oil ratios reach an uneconomical level. The above cycle may then be repeated. Generally no further treatment is necessary, however, for a period of from 3 Σto 6 months.

When injecting the foaming agent solution into the formation it, like any fluid, tends to seek out the more permeable sections. When gas follows the pattern taken by the solution of foam agent it agitates the latter to form foam. Because of its sensitivity to a flowing oil saturation, however, foaming agents of the type contemplated by our invention form foams that break in the predominantly oil bearing sections but are stable in sections of high water content. It also should be pointing out that residual oil in the predominantly water sections has little, if any, effect on foam stability. Accordingly, the continued presence of foam in such water sections stops or reduces the water flow into the producing well. Thus even though the water produced is considered "commingled water" there are generally local sections within the oil sand having substantial water flow. Foams generated in accordance with our invention are readily formed in the predominantly water sections whether within or outside of the primary oil producing zones and function to halt or substantially reduce water flow because of their plugging action. If the produced water is mainly commingled with oil on the microscopic level, the injection of a foaming solution and gas usually will not be able to generate a stable foam. It should be pointed out that the process of our invention, whether applied to shutting off commingled water or nonassociated water, can be used indiscriminantly in any high water cut oil producing well, i.e., without the necessity of isolating the section to be treated.

If the oil is susceptible to viscosity reduction, enriched gas, e.g., or containing not more than about 25 percent of an intermediate hydrocarbon $C_2$—$C_6$, for example propane, can be injected either for the generation of foam and the subsequent enrichment of oil resulting in a reduction of its viscosity or the enriched gas may be injected after the foam has been established. It should be pointed out that pressure process of our invention increases the efficiency of gas contact with the oil bearing zones where such gas is injected after establishment of foam in the water zones. Thus in many cases where most of the injected gas would ordinarily enter the water zones in the absence of generated. by our invention it is forced into the oil zones causing decreased viscosity and resulting in increased oil production rates.

Usually the formation of foam is indicated by either the buildup of gas injection pressure at constant flow rate or by reduction of the gas flow rate at constant injection pressure. Thus where a constant gas injection pressure is employed, the establishment of an adequate foam band or bank is indicated by a decrease in gas flow rate. If it is desired to use a constant gas flow rather than constant pressure, the pressure increase may be used to indicate the occurrence of sufficient foam formation. The degree to which the rate decreases at constant pressure, or the pressure increases at constant rate, i.e., the degree to which the gas injectivity decreases, depends upon the number of zones in which foam is generated. In very high water-oil ratio situations the injectivity may decrease very markedly by a factor of 5 or more. In relatively low water-oil ratio situations the injectivity decrease upon foam generation in the water areas is less. In most cases it is anticipated that at least a 10 percent decrease in injectivity occurs. In general, foam formation can be considered adequate when the gas injection pressure is observed to increase from about 100 to about 500 p.s.i. over the initial injection pressure at constant injection rate. In this connection, however, it should be noted that in relatively high pressure reservoirs the gas injection pressure increase should be less than that which gives a total pressure capable of fracturing the formation.

In carrying out treatment of the reservoir near the producing well bore face in accordance with our invention it is preferred to establish the band or bank of foam at an appreciable distance, e.g., at least about 10 and up to about 100 feet, from the well bore, so that adequate injectivity during the treatment and oil productivity after the treatment are maintained. The volume of foaming agent solution employed depends on the depth of plugging desired. This depth will rarely be less than 10 or 12 feet and will usually be somewhere in the range extending radially from about 25 to about 100 feet from the well. The volume of foam generated generally is about three or four times the volume of foaming agent solution injected. Accordingly, the total volume of foaming agent solution should be about one-third or one-fourth the volume required to fill the formation pore space with foam out to the desired distance. For most formations this amounts to roughly from about 150 to about 15,000 gallons for each vertical foot of formation to be filled with foam. This volume of foaming agent solution does not necessarily have any relationship to the pore volume of the oil bearing zone, a value commonly used in specifying volumes of treating liquids, particularly in secondary recovery operations. In more general terms the volume of foaming agent solution employed in any given cycle or batch will correspond to the pore volume of the portion of the formation to be filled with foam divided by the product of the ratio of the volume of gas to volume of foaming agent solution injected multiplied by the number of batches into which the foaming agent solution is to be divided.

The volume of gas used to make the foam, as previously noted, should be about three times the volume of foaming agent solution at formation conditions of temperature and pressure. No formations have been found where the volume of gas required to generate the foam should be less than about two or more than about four times the volume of foaming agent solution in order to form an effective foam. However, since some gas may enter oil bearing zones, the amount of gas injected may be greater than that needed to create the foam. For most applications the gas volume at reservoir condition need not be greater than 10 times the volume of foaming agent.

The gas employed can be any inert gas such as air, nitrogen, flue gas, natural gas, enriched gas, or the like. For our purposes the term "inert gas" means any gas which has little, if any, tendency to break the foam. Natural gas which is mostly methane is preferred, particularly if it is available at high pressures.

The water slug, free or essentially free of foaming agent, used immediately after injection of the foaming agent solution may vary widely in volume, and in general it may be said that such slug will vary in volume ranging from about 5 to 100 percent of the volume of foaming agent solution injected. In most cases the slug hereinafter referred to as "liquid slug" or "inert liquid", consists of water or brine, however, other liquids may be used which prevent the formation of foam immediately adjacent to the well bore. Additional liquids which may be used to form the liquid slug are oil and alcohols, either water or oil soluble types. The amount of slug material employed should fill the zone into which the foaming agent solution is injected to a radial distance of at least about 5 feet from the well. This prevents any contact of the gas with the foaming agent solution in the zone adjacent to the well bore. When gas is injected into a formation containing a foaming agent solution a volume of foam is formed equal to about four times the volume of foaming agent solution. This is because as gas is injected into a liquid filled formation it must displace a volume of liquid equal to the volume of gas injected until the leading fingers of gas extend beyond the liquid filled portions of the formation. Thus, some of the slug is displaced by gas. With the slug displacing foaming agent solution ahead of it, the result is that a volume of the slug sufficient to fill the treated formation to a distance of about 7 or 8 feet from the well displaces the foaming agent solution to a distance of about 10 or 12 feet before the gas penetrates the slug and enters the foaming agent solution.

In general either water soluble or oil soluble water foaming agents can be used. Ordinarily anionic or nonionic materials are operable. The water soluble agents are preferred because of their low cost and because there is at least some tendency of the foam to break in the presence of oil—which is desirable. This tendency to break with oil flow insures breakage of any foam formed in the oil zone. Various suitable foaming agents are listed in Table I of U.S. Pat. No. 3,330,346. Others are listed in U.S. Pat. No. 3,318,379. The foaming agent to be used as well as the concentration of such agent in the solution injected may, of course, vary somewhat with the salinity of the water in which it is dispersed or dissolved, the nature of the brine or oil naturally present in the process in which the solution is to be used, etc. Ordinarily the foaming agent should be used in a concentration of about 1 or 2 percent by weight of the solution. A concentration of less than about 0.1 percent usually is not advisable because a relatively small loss can reduce the surfactant concentration below the foamability level. Concentrations as low as 0.01 percent by weight have been observed to produce some benefits, however. Concentrations in the range of about 5 to 10 percent may cause a change in the nature of the foam leading to less plugging action than is produced in lower foaming agent concentrations. Therefore, use of more than 5 or 10 percent is often inadvisable not only because of the greater cost, but because of the poor results.

It should be emphasized that the process of our invention, although straightforward, can be indiscriminantly used in any high water cut oil producing well. The process is self adjusting in the sense that it will combat the flow of water by an action suitable to the cause of water production. An ideal application of our process is in conjunction with enriched gas injection—oil production methods where the well is producing with a substantial water cut. Since facilities for injecting gas are already available, a large improvement in the economics of oil production can be achieved by a very small additional investment for foaming agent.

An additional step may be added to the process in some cases, such as those occurring as a result of water blockage, after foam has been generated. Generation of the foam in the water zones decreases the flow capacity of these zones so that future fluids selectively enter the oil zones. This may be used to advantage for injecting relatively small volumes of fluids miscible with both water and oil for example, alcohols, into the oil zone to decrease the water saturation that may exist and thus improve the oil production rate. The volume of this miscible agent should be enough to achieve a miscible condition from the well bore out to about 5 feet therefrom so that when the well is put on production, the miscible fluid is swept into the well bore and replaced essentially with oil. If the miscible fluid is alcohol or other agents which destroy foam, any small amount of foam generated in the oil zone near the well bore is removed. Examples of suitable miscible liquids contemplated are the $C_3$ to $C_5$ alcohols and aqueous micellar solutions in which oil is the external phase. Examples of the latter are to be found in the following U.S. Pat. Nos.: 3,126,952, 3,266,570, 3,301,325, 3,254,714 and 3,308,068.

The example which follows illustrates a typical process of our invention:

EXAMPLE

A well in which our invention is employed has about 100 feet of net pay beginning at a depth of approximately 4,000 feet. The reservoir pressure is 400 p.s.i.g., the oil viscosity 100 c.p., and the production is mainly due to edge water encroachment from a large aquifer. Due in part to the very poor displacement efficiency because of the viscous nature of the oil and to a large degree to the existence of a fracture network and/or high permeability streaks in the reservoir, the oil production of 20 barrels per day is accompanied by production of 100 barrels of water per day. A 500 barrel slug of a 2 percent oil-sensitive surface-active agent such as, for example, OK Liquid, is then injected into the well. This is followed by a 50 barrel slug of water containing no surface active agent after which dry gas or field gas (at least 90 percent methane) or an inert gas such as flue gas, is injected into the well at a pressure of 1200 p.s.i.g. until the gas flow rate decreases to 50 percent or less of its initial value of 200 Mc.f. per hour and remains constant. Approximately 1000 Mc.f. is required to accomplish this in about 8 hours. Under these conditions foam is formed in the high water flow capacity network adjacent to the well bore. Thereafter, injection of an enriched gas consisting primarily of 80 percent methane and about 20 percent propane is begun. The flow of enriched gas into the foam-bearing water zones is impeded and diverted into the oil-bearing zones. Injection at 1200 p.s.i.g. is continued for 15 days during which time 36,000 Mc.f. of enriched gas is injected into the porous formation. Thereafter, the well is placed back on production. Initially, the oil rate is 100 barrels per day with 10 barrels of water produced. About 500 Mc.f. per day of gas is also produced initially, but this declines to less than 70 Mc.f. per day in less than 10 days. In three months time the oil rate has dropped to 30 barrels per day and the water rate is 40 barrels per day. Enriched gas is again injected and an increase in oil rate and a decrease in water rate is obtained. Periodically the foam is replenished or reestablished in the more permeable zones essentially in the same manner as carried out initially.

We claim:

1. In a process for recovering oil from an oil bearing formation having a production well extending into said formation and wherein a substantial flow of nonassociated water from said formation accompanies the flow of oil into said well, the method of substantially reducing said water flow by injecting into said formation via said production well a solution of an oil-sensitive water-foaming agent in an amount corresponding to from about 150 to about 15,000 gallons per vertical foot of formation to be filled with foam, following the solution of said foaming agent with a liquid slug and thereafter forcing said solution and said slug through said formation via said production well with an inert gas until a foam bank has been established.

2. The method of claim 1 in which the liquid slug is employed in an amount corresponding from about 5 to about 100 percent of the volume of foaming agent solution employed.

3. The method of claim 2 in which the foaming agent solution is employed in a concentration of from about 1 to about 2 weight percent of said solution.

4. The method of claim 2 in which the inert gas injected is a natural gas.

5. The method of claim 2 in which the gas injected is an enriched natural gas.

6. The method of claim 2 in which the gas component injected constitutes dry gas followed by enriched gas.

7. The method of claim 2 in which the liquid slug is oil.

8. The method of claim 2 in which the liquid slug is water soluble alcohol.

9. The method of claim 2 in which the liquid slug is water.

10. The method of claim 1 wherein the foaming agent solution, the liquid slug, and inert gas are sequentially but indiscriminantly injected into the oil bearing formation.

11. The method of claim 1 wherein the inert gas is injected into the oil bearing formation at a constant pressure until a decrease in gas flow rate of at least 10 percent of the original flow rate is observed.

12. The method of claim 1 wherein the inert gas is injected into the oil bearing formation at a constant flow rate until the injection pressure has increased by about 100 to about 500 p.s.i.

13. The method of claim 1 in which the volume of gas employed in actual foam formation ranges from about two to about four times the volume of foaming agent solution used.

14. The method of claim 1 wherein the total volume of gas employed does not exceed about ten times the volume of foaming agent used.

15. The method of claim 1 wherein an oil-water miscible slug is injected into said formation followed by the gas injection step and prior to the well being placed on production.

PO-1050
(5/69)

UNITED STATES PATENT OFFICE
CERTIFICATE OF CORRECTION

Patent No. 3,547,199            Dated December 15, 1970

Inventor(s)    H R. Froning; Jack L. Shelton; Syed H. Raza

It is certified that error appears in the above-identified paten and that said Letters Patent are hereby corrected as shown below:

Column 1, line 41, "effective" should be --commingled--;

line 54, "125" should be --25--;

line 60, " $\Sigma$ " should be deleted;

line 68, "plugging" should be --pointed--.

Column 2, line 13, "or" should be --gas--;

line 18, delete "pressure" and add --the--;

line 23, delete "generated" and add --foam--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents